US012782786B2

(12) United States Patent
Lin et al.

(10) Patent No.: US 12,782,786 B2
(45) Date of Patent: Nov. 3, 2026

(54) ELECTRONIC DEVICE

(71) Applicant: AUO Corporation, Hsin-Chu (TW)

(72) Inventors: Chin-An Lin, Hsin-Chu (TW); Shiang-Lin Lian, Hsin-Chu (TW); Jen-Hao Shih, Hsin-Chu (TW); Kun-Cheng Tien, Hsin-Chu (TW); Chien-Huang Liao, Hsin-Chu (TW); Yueh-Hung Chung, Hsin-Chu (TW); Chun-Lung Huang, Hsin-Chu (TW); Ya-Ling Hsu, Hsin-Chu (TW); Liang-Yin Huang, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 369 days.

(21) Appl. No.: 18/398,245

(22) Filed: Dec. 28, 2023

(65) Prior Publication Data

US 2025/0110375 A1 Apr. 3, 2025

(30) Foreign Application Priority Data

Sep. 28, 2023 (TW) ................................ 112137538

(51) Int. Cl.
*G02F 1/155* (2006.01)
*G02F 1/153* (2006.01)

(52) U.S. Cl.
CPC ............ *G02F 1/155* (2013.01); *G02F 1/1533* (2013.01); *G02F 2001/1555* (2013.01)

(58) Field of Classification Search
CPC ................... G02F 1/155; G02F 1/1533; G02F 2001/1555; G02F 1/163; G02F 1/15
(Continued)

(56) References Cited

U.S. PATENT DOCUMENTS

2004/0253401 A1* 12/2004 Pratt ...................... B23K 26/08 219/121.69
2008/0252202 A1* 10/2008 Li ......................... H10K 59/90 313/504
(Continued)

FOREIGN PATENT DOCUMENTS

CN 106057856 A 10/2016
CN 218181283 U 12/2022
(Continued)

OTHER PUBLICATIONS

Office Action issued by (TIPO) Taiwan Intellectual Property Office Ministry of Economic Affairs R.O.C., Jun. 26, 2024, for Application No. 112137538 Taiwan.
(Continued)

*Primary Examiner* — Mohammed A Hasan
(74) *Attorney, Agent, or Firm* — Tim Tingkang Xia., Esq.; Troutman Pepper Locke LLP

(57) ABSTRACT

An electronic device includes a first base, a plurality of electrodes, a plurality of traces, an insulating layer, a second base and an electrochromic layer. The electrodes are disposed on the first base. Each electrode includes a mesh conductive pattern and a transparent conductive pattern. The mesh conductive pattern has a plurality of mesh lines and a plurality of meshes defined by the mesh lines. The transparent conductive pattern covers the mesh lines and the meshes, and is electrically connected to the mesh conductive pattern. The traces are disposed on the first base, and are electrically connected to the electrodes respectively. The insulating layer is disposed on the first base, and at least covers the traces. The second base is disposed opposite to the first base.

20 Claims, 11 Drawing Sheets

(58) Field of Classification Search
USPC .......................................................... 359/275
See application file for complete search history.

(56) References Cited

U.S. PATENT DOCUMENTS

| | | | | |
|---|---|---|---|---|
| 2012/0081775 | A1* | 4/2012 | Ersman | G02F 1/155 359/270 |
| 2012/0147448 | A1* | 6/2012 | Yaniv | G02F 1/155 29/846 |
| 2021/0405494 | A1* | 12/2021 | Liu | H04N 23/60 |

FOREIGN PATENT DOCUMENTS

| | | | |
|---|---|---|---|
| CN | 115798428 | A | 3/2023 |
| CN | 116009320 | A | 4/2023 |
| CN | 116110911 | A | 5/2023 |
| CN | 116300237 | A | 6/2023 |
| TW | 202004312 | A | 1/2020 |
| TW | 1742705 | B | 10/2021 |
| WO | 2019144563 | A1 | 8/2019 |

OTHER PUBLICATIONS

Office Action issued by the Chinese Intellectual Property Office for Application No. 202410242345.1, Jul. 8, 2026, China.

* cited by examiner

P {120, 220} 100 {110, 120} 120 {122 {122a, 122b}, 124} 200 {210, 220} 220 {222 {222a, 222b}, 224}

P {120, 220}    100 {110, 120}    120 {122 {122a, 122b}, 124}    200 {210, 220}    220 {222 {222a, 222b}, 224}

ELECTRONIC DEVICE

CROSS-REFERENCE TO RELATED PATENT APPLICATION

This non-provisional application claims priority to and the benefit of, pursuant to 35 U.S.C. § 119(a), patent application Serial No. 112137538 filed in Taiwan on Sep. 28, 2023. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to an electronic device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transparent display panel refers to a display device which may provide a transparent display state for a user to view the scene behind it. The transparent display panel has a display region and a transparent region. The display region may provide a display image for the user's view, and the transparent region is in the transparent state for the user to view the scene behind it. The display region is disposed with pixels for emitting image light beams toward a display surface of the transparent display panel, thereby providing the image. Under the influence of the ambient light, the transparent display panel generally has low contrast. To increase the contrast of the transparent display panel, a dimming panel may be disposed behind the transparent display panel. The dimming panel may be switched to a shading mode to block the ambient light, thereby increasing the contrast.

The dimming panel includes a first substrate, a second substrate disposed opposite to the first substrate and an electrochromic layer disposed between the first substrate and the second substrate. By controlling a voltage difference between the electrode of the first substrate and the electrode of the second substrate, the electrochromic layer may change from the transparent state to the light absorbing state, such that the dimming panel is switched to the shading mode. However, when the electrochromic layer changes from the transparent state to the light absorbing state, its resistance also decreases. At this time, if the resistances of the electrode of the first substrate/the electrode of the second substrate are too high, the driving current may tend to flow through the portion of the electrochromic layer that has already changed to the light absorbing state, without easily flowing through the other portion of the electrochromic layer that has not yet changed to the light absorbing state, thus resulting in the dimming panel not being able to turn uniformly black across the entire area.

SUMMARY

The present disclosure provides an electronic device having good characteristics.

The electronic device according to certain embodiments of the present disclosure includes a first base, a plurality of electrodes, a plurality of traces, an insulating layer, a second base and an electrochromic layer. The electrodes are disposed on the first base. Each electrode includes a mesh conductive pattern and a transparent conductive pattern. The mesh conductive pattern has a plurality of mesh lines and a plurality of meshes defined by the mesh lines. The transparent conductive pattern covers the mesh lines and the meshes, and is electrically connected to the mesh conductive pattern. The traces are disposed on the first base, and are electrically connected to the electrodes respectively. The insulating layer is disposed on the first base, and at least covers the traces. The second base is disposed opposite to the first base.

In one embodiment of the present disclosure, each of the traces includes a first metal layer and a second metal layer, the second metal layer covers a top surface and a side wall of the first metal layer, the second metal layer is disposed between the insulating layer and the first metal layer, the insulating layer is disposed between the electrochromic layer and the second metal layer, and the insulating layer covers a top surface and a side wall of the second metal layer.

In one embodiment of the present disclosure, a portion of the insulating layer is disposed between the transparent conductive pattern of a corresponding one of the electrodes and the second metal layer of a corresponding one of the traces.

In one embodiment of the present disclosure, each of the mesh lines of the mesh conductive pattern includes a first metal layer and the second metal layer, the second metal layer covers a top surface and a side wall of the first metal layer, the second metal layer is disposed between the transparent conductive pattern and the first metal layer, and the transparent conductive pattern is disposed between the electrochromic layer and the second metal layer.

In one embodiment of the present disclosure, the insulating layer has a plurality of openings, and the transparent conductive patterns of the electrodes are filled into the openings and are electrically connected to the mesh conductive patterns of the electrodes.

In one embodiment of the present disclosure, each of the openings overlaps with the mesh lines and the meshes of a corresponding one of the electrodes.

In one embodiment of the present disclosure, each of the openings overlaps with the mesh lines of a corresponding one of the electrodes, and the insulating layer covers the meshes of the corresponding one of the electrodes.

In one embodiment of the present disclosure, the mesh lines include a first section, a second section, a third section and a fourth section defining one of the meshes and connected in series with each other, the first section, the second section, the third section and the fourth section respectively form a first angle, a second angle, a third angle and a fourth angle with respect to a reference line, the first angle, the second angle, the third angle and the fourth angle are respectively θ1, θ2, θ3 and θ4, and θ4>θ3>θ2>θ1.

In one embodiment of the present disclosure, the traces respectively have a plurality of signal input terminals, the signal input terminals are disposed adjacent to an edge of the first base, a first direction intersects with the edge of the first base, the electrodes include a first electrode and a second electrode arranged in the first direction, the first electrode is farther away from the edge of the first base than the second electrode, the traces include a first trace and a second trace electrically connected to the first electrode and the second electrode respectively, a second direction intersects with the first direction, the first trace and the second trace respectively have a first line width and a second line width in the second direction, and the first line width is greater than the second line width.

In one embodiment of the present disclosure, the traces respectively have a plurality of signal input terminals, the signal input terminals are disposed adjacent to an edge of the first base, a first direction intersects with the edge of the first base, the electrodes include a first electrode and a second electrode arranged in the first direction, the first electrode is farther away from the edge of the first base than the second electrode, the traces include a first trace and a second trace electrically connected to the first electrode and the second electrode respectively, and a voltage input to a respective signal input terminal of the first trace is greater than a voltage input to a respective signal input terminal of the second trace.

In one embodiment of the present disclosure, the first base has a first surface and a second surface opposite to each other, the first surface faces toward the electrochromic layer, the second surface faces away from the electrochromic layer, the first base has a plurality of through holes running through the first surface and the second surface, the electronic device further comprises a plurality of conductive objects respectively filled into the through holes, the conductive objects are electrically connected to the electrodes respectively, and the traces are disposed on the second surface of the first base and are electrically connected to the conductive objects respectively.

These and other aspects of the present disclosure will become apparent from the following description of the embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
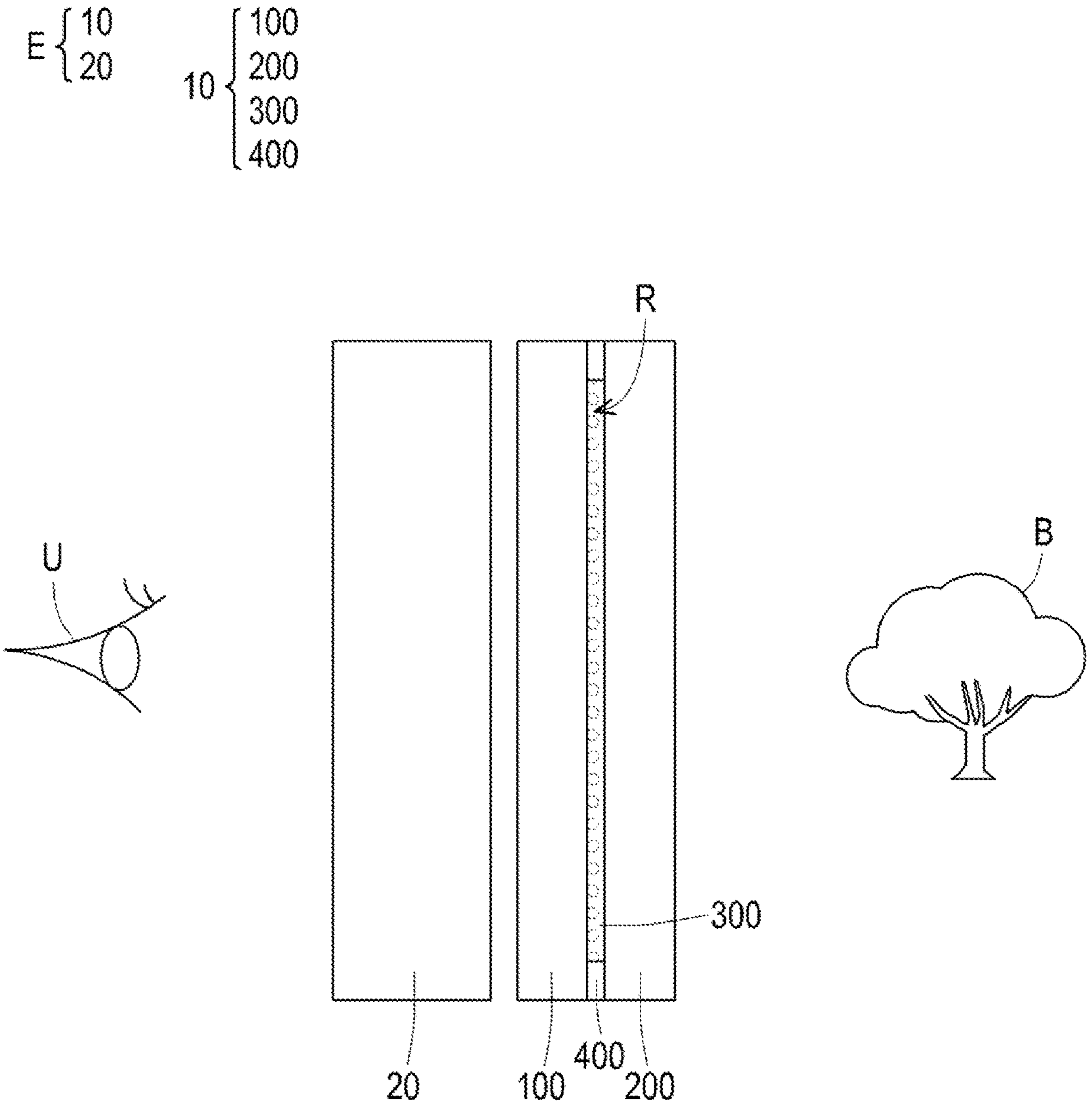
FIG. 1 is a sectional schematic view of an electronic device according to one embodiment of the present disclosure.

The present disclosure will now be described hereinafter in details with reference to the accompanying drawings, in which exemplary embodiments of the disclosure are shown. Whenever possible, identical reference numerals refer to identical or like elements in the drawings and descriptions.

It should be understood that when one component such as a layer, a film, a region or a substrate is referred to as being disposed "on" the other component or "connected to" the other component, the component may be directly disposed on the other component or connected to the other component, or an intermediate component may also exist between the two components. In contrast, when one component is referred to as being "directly disposed on the other component" or "directly connected to" the other component, no intermediate component exists therebetween. As used herein, a "connection" may be a physical and/or electrical connection. In addition, when two components are "electrically connected" or "coupled", other components may exist between the two components.

The terms "about", "approximately" or "substantially" as used herein shall cover the values described, and cover an average value of an acceptable deviation range of the specific values ascertained by one of ordinary skill in the art, where the deviation range may be determined by the measurement described and specific quantities of errors related to the measurement (that is, the limitations of the measuring system). For example, the term "about" represents within one or more standard deviations of a given value of range, such as within ±30 percent, within ±20 percent, within +10 percent or within +5 percent. Moreover, the terms "about", "approximately" or "substantially" as used herein may selectively refer to a more acceptable deviation range or the standard deviation based on the optical characteristics, the etching characteristic or other characteristics, without applying one standard deviation to all characteristics.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 1 is a sectional schematic view of an electronic device according to one embodiment of the present disclosure. Referring to FIG. 1, the electronic device E includes a transparent display panel 20 and a dimming panel 10 disposed behind the transparent display panel 20. The dimming panel 10 may be switched among a transparent mode, a shading mode and a partial-transparent partial-shading mode. When the dimming panel 10 is switched to the transparent mode, a user U may view the display image of the transparent display panel 20, and may simultaneously view the background B behind the transparent display panel 20. When the dimming panel 10 is switched to the shading mode, the user U may more clearly view the display image with higher contrast, but cannot view the background B at the rear. When the dimming panel 10 is switched to the partial-transparent partial-shading mode, a dimming region of the dimming panel 10 includes a first light control region (not labeled) and a second light control region (not labeled), where the first light control region is transparent, and the second light control region shades light. A display region (not labeled) of the transparent display panel 20 includes a first display region (not labeled) and a second display region (not labeled) respectively overlapping with the first light control region and the second light control region. The electronic device E may provide transparent display effect at the location of the first display region, and may provide an opaque display image with higher contrast.

The dimming panel 10 includes a first substrate 100, a second substrate 200, an electrochromic layer 300 and a frame adhesive 400. The frame adhesive 400 is connected to the first substrate 100 and the second substrate 200 and collectively defines a receiving space R with the first substrate 100 and the second substrate 200, and the electrochromic layer 300 is encapsulated in the receiving space R. By controlling the voltage of the electrode (not illustrated) of at least one of the first substrate 100 and the second substrate 200, the dimming panel 10 may be switched to the transparent mode, the shading mode or the partial-transparent partial-shading mode. The structure and the operating method of the dimming panel 10 are hereinafter described with respect to other exemplary drawings as follows.

Figure 2:
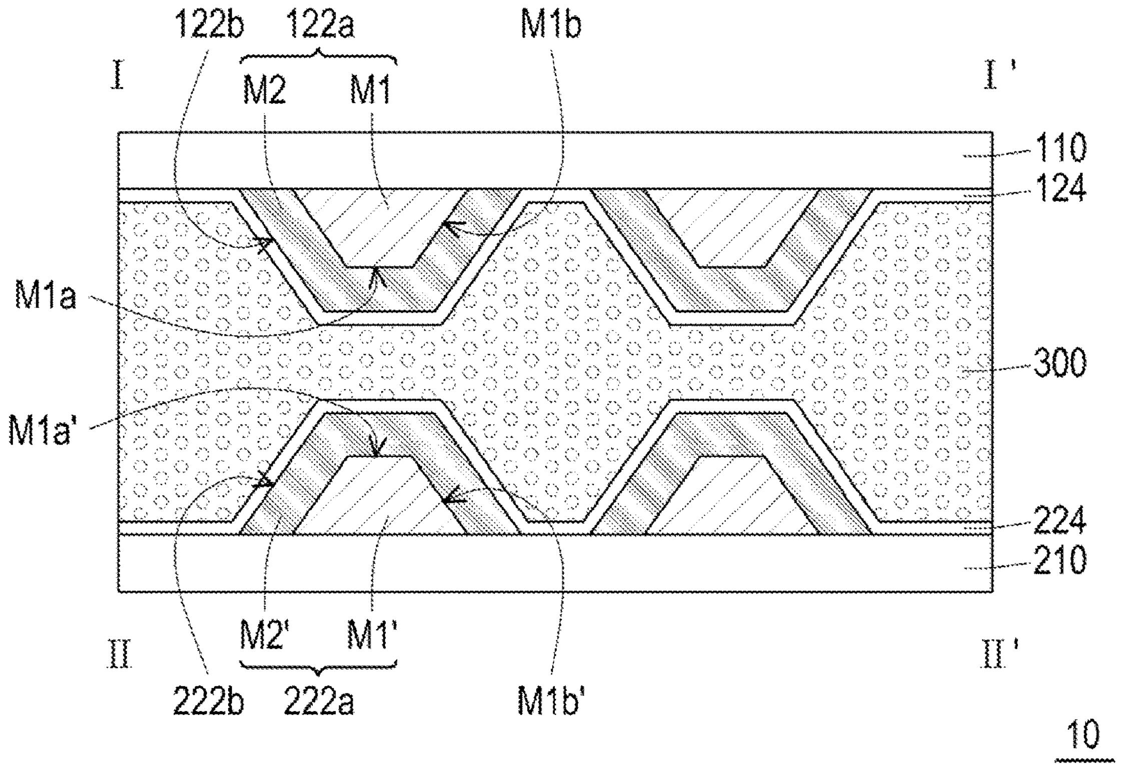
FIG. 2 is a sectional schematic view of a dimming panel according to one embodiment of the present disclosure.
Figure 3:
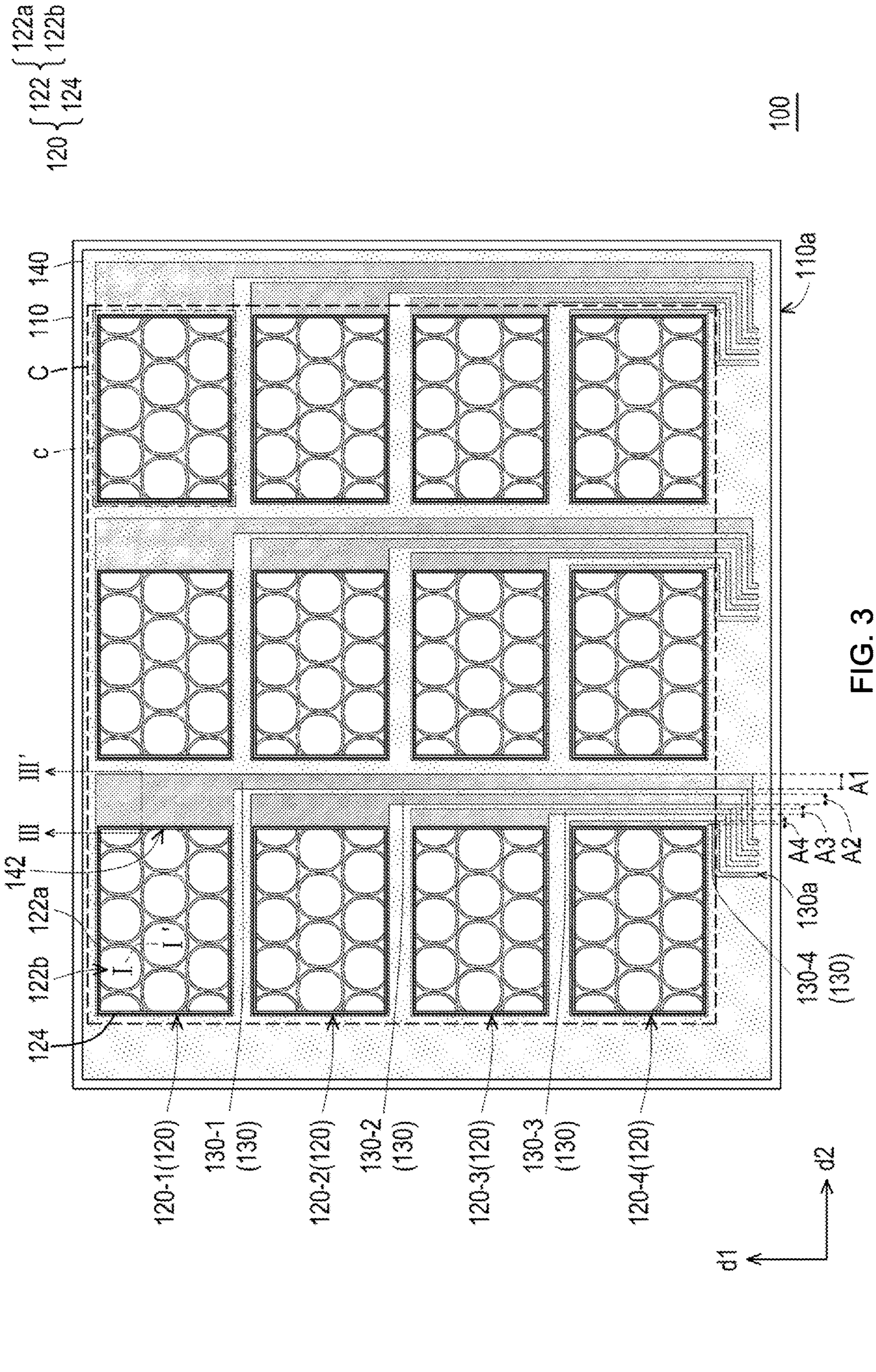
FIG. 3 is a top schematic view of a first substrate of the dimming panel according to one embodiment of the present disclosure.
Figure 4:
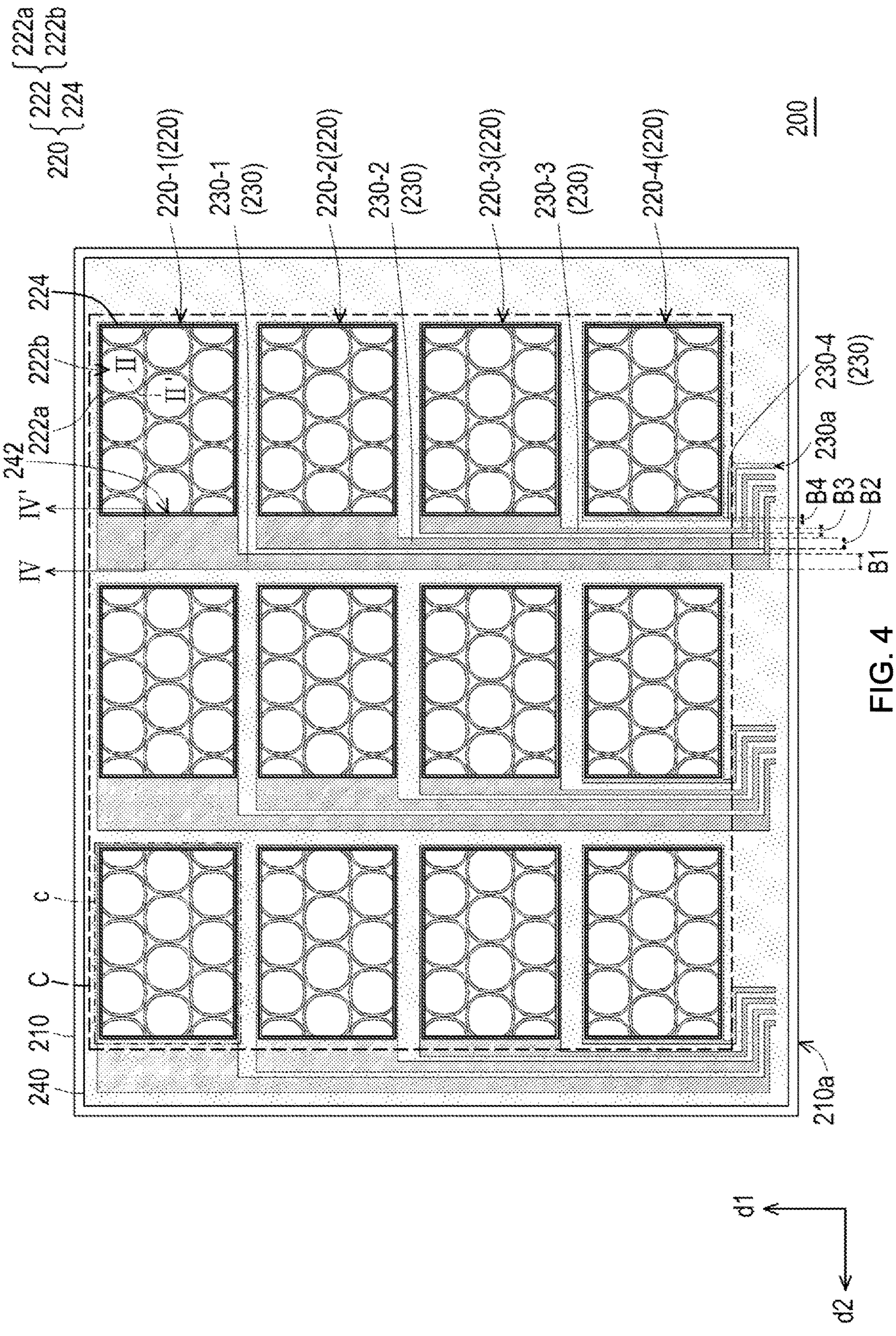
FIG. 4 is a top schematic view of a second substrate of the dimming panel according to one embodiment of the present disclosure.
Figure 5:
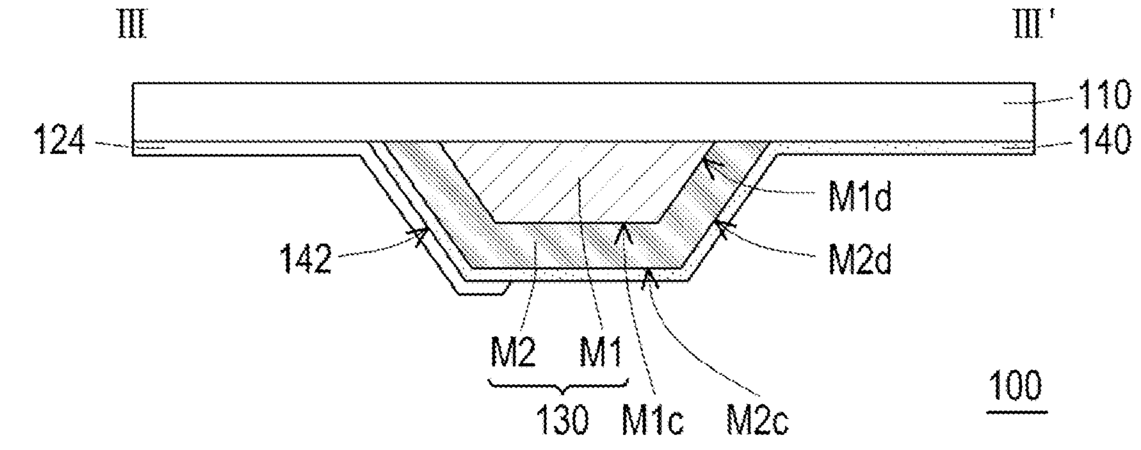
FIG. 5 is a sectional schematic view of the first substrate of the dimming panel according to one embodiment of the present disclosure.
Figure 6:
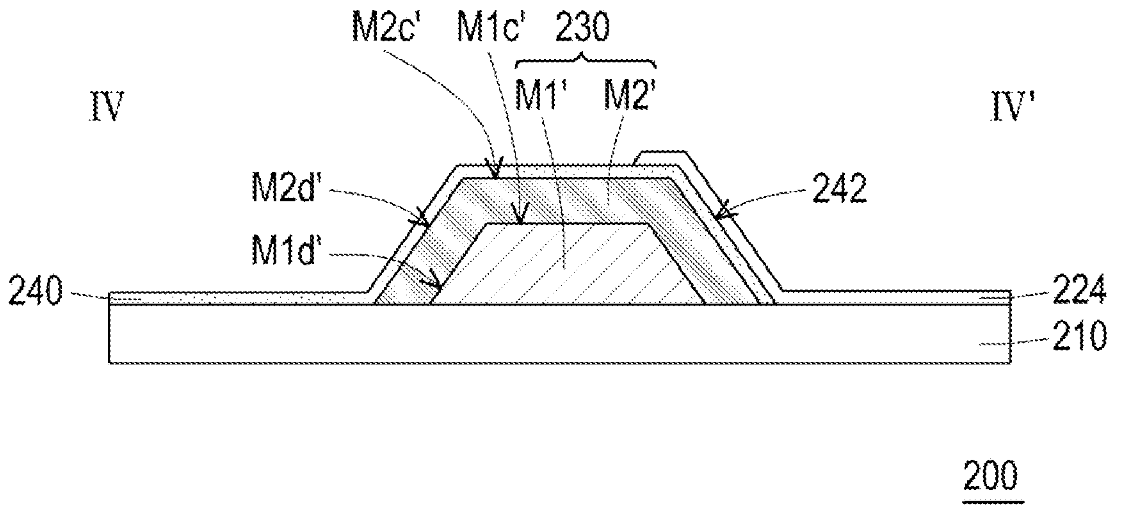
FIG. 6 is a sectional schematic view of the second substrate of the dimming panel according to one embodiment of the present disclosure.

FIG. 2 is a sectional schematic view of a dimming panel according to one embodiment of the present disclosure. FIG. 3 is a top schematic view of a first substrate of the dimming panel according to one embodiment of the present disclosure. FIG. 4 is a top schematic view of a second substrate of the dimming panel according to one embodiment of the present disclosure. FIG. 2 corresponds to the sectional line I-I' of FIG. 3 and the sectional line II-II' of FIG. 4. FIG. 5 is a sectional schematic view of the first substrate of the dimming panel according to one embodiment of the present disclosure. FIG. 5 corresponds to the sectional line III-III' of FIG. 3. FIG. 6 is a sectional schematic view of the second substrate of the dimming panel according to one embodiment of the present disclosure. FIG. 6 corresponds to the sectional line IV-IV' of FIG. 4.

Referring to FIG. 2 and FIG. 3, the first substrate 100 of the dimming panel 10 includes a first base 110 and a plurality of electrodes 120. The first base 110 is transparent. The electrodes 120 are disposed on the first base 110, and are structurally separated from each other. Each electrode 120 includes a mesh conductive pattern 122 and a transparent conductive pattern 124. The mesh conductive pattern 122 has a plurality of mesh lines **122*a* and a plurality of meshes 122*b* defined by the mesh lines 122*a*. The transparent conductive pattern 124 covers the mesh lines 122*a* and the meshes 122*b*, and is electrically connected to the mesh conductive pattern 122**.

In one embodiment, each mesh line **122*a* of the mesh conductive pattern 122 includes a first metal layer M1 and the second metal layer M2. The second metal layer M2 of each mesh line 122*a* covers a top surface M1*a* and a side wall M1*b* of the first metal layer M1 of each mesh line 122*a*. The second metal layer M2 of each mesh line 122*a* is disposed between the transparent conductive pattern 124 and the first metal layer M1 of each mesh line 122*a*, and the transparent conductive pattern 124 is disposed between the electrochromic layer 300 and the second metal layer M2 of each mesh line 122*a***.

For example, in one embodiment, the material of the transparent conductive pattern 124 may include metal oxides, such as indium tin oxide, indium zinc oxide, aluminum tin oxide, aluminum zinc oxide, indium germanium zinc oxide, other suitable oxides, or a stacked layer of at least two thereof, but the present disclosure is not limited thereto.

Referring to FIG. 3 and FIG. 5, the first substrate 100 further includes a plurality of traces 130, disposed on the first base 110, and electrically connected to the electrodes 120 respectively. In one embodiment, each trace 130 may include a first metal layer M1 and the second metal layer M2. The second metal layer M2 of each trace 130 covers a top surface **M1*c* and a side wall M1*d* of the first metal layer M1 of each trace 130. In one embodiment, the first metal layer M1 of each trace 130 and the first metal layers M1 of the mesh lines 122*a* of a corresponding electrode 120 belong to the same film layer and are directly connected, and the second metal layer M2 of each trace 130 and the second metal layers M2 of the mesh lines 122*a* of the corresponding electrode 120** belong to the same film layer and are directly connected, but the present disclosure is not limited thereto.

Referring to FIG. 2, FIG. 3 and FIG. 5, the first substrate 100 further includes an insulating layer 140, disposed on the first base 110, and at least covering the traces 130. The insulating layer 140 may separate the traces 130 and the electrochromic layer 300, preventing the electrochromic layer 300 from damaging the traces 130. In one embodiment, the insulating layer 140 covers a top surface **M2*c* and a side wall M2*d* of the second metal layer M2 of each trace 130, the second metal layer M2 of each trace 130 is disposed between the insulating layer 140 and the first metal layer M1 of each trace 130, and the insulating layer 140 is disposed between the electrochromic layer 300 and the second metal layer M2 of each trace 130**.

Referring to FIG. 2, FIG. 3 and FIG. 5, in one embodiment, the insulating layer 140 has a plurality of openings 142, and the transparent conductive patterns 124 of the electrodes 120 are filled into the openings 142 of the insulating layer 140 and are electrically connected to the mesh conductive patterns 122 of the electrodes 120. For example, in one embodiment, each opening 142 of the insulating layer 140 overlaps with the mesh lines **122*a* and the meshes 122*b* of a corresponding electrode 120, and each transparent conductive pattern 124 are filled into a corresponding opening 142 of the insulating layer 140 and are electrically connected to a corresponding mesh conductive pattern 122**.

Referring to FIG. 3 and FIG. 5, in one embodiment, a portion of the insulating layer 140 may be disposed between the transparent conductive patterns 124 of the electrodes 120 and the second metal layers M2 of the traces 130. In one embodiment, an outer edge of each transparent conductive pattern 124 may optionally cover the portion of the insulating layer 140 located on a corresponding trace 130, without completely cover the whole trace 130. However, the present disclosure is not limited thereto, and in other embodiments not illustrated, each transparent conductive pattern 124 may completely cover a corresponding trace 130, and the transparent conductive patterns 124 covering different traces 130 are separated from each other. For example, the transparent conductive patterns 124 covering different traces 130 may be separated for at least 5 μm to 15 μm.

Referring to FIG. 3, in one embodiment, the electrode 120 located farther away from the edge 110*a* (that is, the side of the corresponding signal input terminal 130*a* being located) needs to be electrically connected to a longer trace 130. The longer trace 130 has a greater resistance, and the electrode 120 being electrically connected to the longer trace 130 faces higher resistive and capacitive losses. To ensure that the electrochromic layer 300 on the electrodes 120 at different distances from the edge 110*a* senses an identical or similar voltage, the voltage input to the signal input terminals 130*a* may be adjusted.

For example, in one embodiment, the traces 130 respectively have a plurality of signal input terminals 130*a*, and the signal input terminals 130*a* are disposed adjacent to an edge 110*a* of the first base 110. The first direction d1 intersects with the edge 110*a* of the first base 110. The electrodes 120 include a first electrode 120-1, a second electrode 120-2, a third electrode 120-3 and a fourth electrode 120-4 arranged in the first direction d1. The first electrode 120-1 is farther away from the edge 110*a* of the first base 110 than the second electrode 120-2, the second electrode 120-2 is farther away from the edge 110*a* of the first base 110 than the third electrode 120-3, and the third electrode 120-3 is farther away from the edge 110*a* of the first base 110 than the fourth electrode 120-4. The traces 130 include a first trace 130-1, a second trace 130-2, a third trace 130-3 and a fourth trace 130-4 electrically connected to the first electrode 120-1, the second electrode 120-2, the third electrode 120-3 and the fourth electrode 120-4 respectively. A voltage input to a respective signal input terminal 130*a* of the first trace 130-1 may be greater than a voltage input to a respective signal input terminal 130*a* of the second trace 130-2, the voltage input to the respective signal input terminal 130*a* of the second trace 130-2 may be greater than a voltage input to a respective signal input terminal 130*a* of the third trace 130-3, and the voltage input to the respective signal input terminal 130*a* of the third trace 130-3 may be greater than a voltage input to a respective signal input terminal 130*a* of the fourth trace 130-4. In one embodiment, the voltage input to the signal input terminal 130*a* of the first trace 130-1, the voltage input to the signal input terminal 130*a* of the second trace 130-2, the voltage input to the signal input terminal 130*a* of the third trace 130-3 and the voltage input to the signal input terminal 130*a* of the fourth trace 130-4 are respectively, for example, 3.5 V, 3 V, 2.5 V and 1.9 V, but the present disclosure is not limited thereto.

In addition, in one embodiment, to reduce the difference of the resistances of the traces 130 of different lengths and to decrease the difference of the resistive and capacitive losses faced by the electrodes 120 at different distances from the edge 110*a*, the traces 130 may have different line widths. For example, in one embodiment, the traces 130 respectively have a plurality of signal input terminals 130*a*, and the signal input terminals 130*a* are disposed adjacent to an edge 110*a* of the first base 110. The electrodes 120 include a first electrode 120-1, a second electrode 120-2, a third electrode 120-3 and a fourth electrode 120-4 arranged in the first direction d1. The first electrode 120-1 is farther away from the edge 110*a* of the first base 110 than the second electrode 120-2, the second electrode 120-2 is farther away from the edge 110*a* of the first base 110 than the third electrode 120-3, and the third electrode 120-3 is farther away from the edge 110*a* of the first base 110 than the fourth electrode 120-4. The traces 130 include a first trace 130-1, a second trace 130-2, a third trace 130-3 and a fourth trace 130-4 electrically connected to the first electrode 120-1, the second electrode 120-2, the third electrode 120-3 and the fourth electrode 120-4 respectively. A second direction d2 intersects with the first direction d1. The first trace 130-1, the second trace 130-2, the third trace 130-3 and the fourth trace 130-4 respectively have a first line width A1, a second line width A2, a third line width A3 and a fourth line width A4 in the second direction d2, and A1>A2>A3>A4. However, the present disclosure is not limited thereto, and in other embodiments not illustrated, it may be A1=A2=A3=A4.

Referring to FIG. 2 to FIG. 6, in one embodiment, the second substrate 200 of the dimming panel 10 may optionally have a structure identical or similar to that of the first substrate 100. The structure of the second substrate 200 is described using an example as follows.

Referring to FIG. 2 and FIG. 4, the second substrate 200 of the dimming panel 10 includes a second base 210 and a plurality of electrodes 220. The second base 210 of the second substrate 200 is disposed opposite to the first base 110 of the first substrate 100. The electrochromic layer 300 is disposed between the first base 110 and the second base 210. The second base 210 is transparent. The electrodes 220 are disposed on the second base 210, and are structurally separated from each other. Each electrode 220 includes a mesh conductive pattern 222 and a transparent conductive pattern 224. The mesh conductive pattern 222 has a plurality of mesh lines 222*a* and a plurality of meshes 222*b* defined by the mesh lines 222*a*. The transparent conductive pattern 224 covers the mesh lines 222*a* and the meshes 222*b*, and is electrically connected to the mesh conductive pattern 222.

In one embodiment, each mesh line 222*a* of the mesh conductive pattern 222 includes a first metal layer M1' and the second metal layer M2'. The second metal layer M2' of each mesh line 222*a* covers a top surface M1*a*' and a side wall M1*b*' of the first metal layer M1' of each mesh line 222*a*. The second metal layer M2' of each mesh line 222*a* is disposed between the transparent conductive pattern 224 and the first metal layer M1' of each mesh line 222*a*, and the transparent conductive pattern 224 is disposed between the electrochromic layer 300 and the second metal layer M2' of each mesh line 222*a*.

For example, in one embodiment, the material of the transparent conductive pattern 224 may include metal oxides, such as indium tin oxide, indium zinc oxide, aluminum tin oxide, aluminum zinc oxide, indium germanium zinc oxide, other suitable oxides, or a stacked layer of at least two thereof, but the present disclosure is not limited thereto.

Referring to FIG. 4 and FIG. 6, the second substrate 200 further includes a plurality of traces 230, disposed on the second base 210, and electrically connected to the electrodes 220 respectively. In one embodiment, each trace 230 may include a first metal layer M1' and the second metal layer M2'. The second metal layer M2' of each trace 230 covers a top surface M1*c*' and a side wall M1*d*' of the first metal layer M1' of each trace 230. In one embodiment, the first metal layer M1' of each trace 230 and the first metal layers M1' of the mesh lines 222*a* of a corresponding electrode 220 belong to the same film layer and are directly connected, and the second metal layer M2' of each trace 230 and the second metal layers M2' of the mesh lines 222*a* of the corresponding electrode 220 belong to the same film layer and are directly connected, but the present disclosure is not limited thereto.

Referring to FIG. 2, FIG. 4 and FIG. 6, the second substrate 200 further includes an insulating layer 240, disposed on the second base 210, and at least covering the traces 230. The insulating layer 240 may separate the traces 230 and the electrochromic layer 300, preventing the electrochromic layer 300 from damaging the traces 230. In one embodiment, the insulating layer 240 covers a top surface M2*c*' and a side wall M2*d*' of the second metal layer M2' of each trace 230, the second metal layer M2' of each trace 230 is disposed between the insulating layer 240 and the first metal layer M1' of each trace 230, and the insulating layer 240 is disposed between the electrochromic layer 300 and the second metal layer M2' of each trace 230.

Referring to FIG. 4 and FIG. 6, in one embodiment, the insulating layer 240 has a plurality of openings 242, and the transparent conductive patterns 224 of the electrodes 220 are filled into the openings 242 of the insulating layer 240 and are electrically connected to the mesh conductive patterns 222 of the electrodes 220. For example, in one embodiment, each opening 242 of the insulating layer 240 overlaps with the mesh lines 222*a* and the meshes 222*b* of a corresponding electrode 220, and each transparent conductive pattern 224 are filled into a corresponding opening 242 of the insulating layer 240 and are electrically connected to a corresponding mesh conductive pattern 222.

In one embodiment, a portion of the insulating layer 240 may be disposed between the transparent conductive patterns 224 of the electrodes 220 and the second metal layers M2' of the traces 230. In one embodiment, an outer edge of each transparent conductive pattern 224 may optionally cover the portion of the insulating layer 240 located on a corresponding trace 230, without completely cover the whole trace 230. However, the present disclosure is not limited thereto, and in other embodiments not illustrated, each transparent conductive pattern 224 may completely cover a corresponding trace 230, and the transparent conductive patterns 224 covering different traces 230 are separated from each other. For example, the transparent conductive patterns 224 covering different traces 230 may be separated for at least 5 μm to 15 μm.

Referring to FIG. 4, in one embodiment, the traces 230 respectively have a plurality of signal input terminals 230*a*, and the signal input terminals 230*a* are disposed adjacent to an edge 210*a* of the second base 210. The first direction d1 intersects with the edge 210*a* of the second base 210. The electrodes 220 include a first electrode 220-1, a second electrode 220-2, a third electrode 220-3 and a fourth electrode 220-4 arranged in the first direction d1. The first electrode 220-1 is farther away from the edge 210*a* of the second base 210 than the second electrode 220-2, the second electrode 220-2 is farther away from the edge 210*a* of the second base 210 than the third electrode 220-3, and the third electrode 220-3 is farther away from the edge 210*a* of the second base 210 than the fourth electrode 220-4. The traces 230 include a first trace 230-1, a second trace 230-2, a third trace 230-3 and a fourth trace 230-4 electrically connected to the first electrode 220-1, the second electrode 220-2, the third electrode 220-3 and the fourth electrode 220-4 respectively.

The electrode 220 located farther away from the edge 210*a* (that is, the side of the corresponding signal input terminal 230*a* being located) needs to be electrically connected to a longer trace 230. The longer trace 230 has a greater resistance. In one embodiment, to reduce the difference of the resistances of the traces 230 of different lengths and to decrease the difference of the resistive and capacitive losses faced by the electrodes 220 at different distances from the edge 210*a*, the traces 230 may have different line widths. For example, in one embodiment, the second direction d2 intersects with the first direction d1. The first trace 230-1, the second trace 230-2, the third trace 230-3 and the fourth trace 230-4 respectively have a first line width B1, a second line width B2, a third line width B3 and a fourth line width B4 in the second direction d2, and B1>B2>B3>B4. However, the present disclosure is not limited thereto, and in other embodiments not illustrated, it may be B1=B2=B3=B4.

Referring to FIG. 2, FIG. 3 and FIG. 4, the first substrate 100 and the second substrate 200 may be assembled to each other, thereby forming the dimming panel 10. In one embodiment, after the first substrate 100 and the second substrate 200 are assembled to each other, the electrodes 120 of the first substrate 100 may respectively overlap with the electrodes 220 of the second substrate 200. Each electrode 120 of the first substrate 100 and its overlapping electrode 220 of the second substrate 200 form an electrode assembly P. The electrode assemblies P respectively occupy a plurality of light control regions c of the dimming panel 10. The light control regions c form a dimming region C of the dimming panel 10. By controlling a voltage difference between the two electrodes 120, 220 of each electrode assembly P, the portion of the electrochromic layer 300 in each light control region c may be controlled to be transparent or to shade light, such that the light control region c may be in a transparent state or a shading state. If all of the light control regions c of the dimming panel 100 are in the transparent state, the electronic device E is in the transparent mode. If all of the light control regions c of the dimming panel 100 are in the shading state, the electronic device E is in the shading mode. If some of the light control regions c of the dimming panel 100 are in the shading state, and some other light control regions c are in the transparent state, the electronic device E is in the partial-transparent partial-shading mode. FIG. 3 and FIG. 4 show an example of the dimming panel 100 including 9 light control regions c. However, the present disclosure is not limited thereto, and the quantity and the arrangement of the light control regions c of the dimming panel 100 may have other designs based on actual needs.

It should be noted that the dimming panel 100 includes the electrodes 120/220 disposed in the light control regions c. The light control regions c, which may be in the transparent state or the shading state, are respectively controlled by the electrodes 120/220 instead of being controlled by a same electrode, and each electrode 120/220 is formed by the mesh conductive pattern 122/222 and the transparent conductive pattern 124/224 with a low resistance. Thus, in the process of switching each light control region c of the dimming panel 100 from the shading state to the transparent state, the light control regions c are less likely to have the issue of being unable to turn uniformly black due to the resistance of the electrochromic layer 300 becoming lower than the corresponding resistances of the electrodes 120/220.

Figure 7:
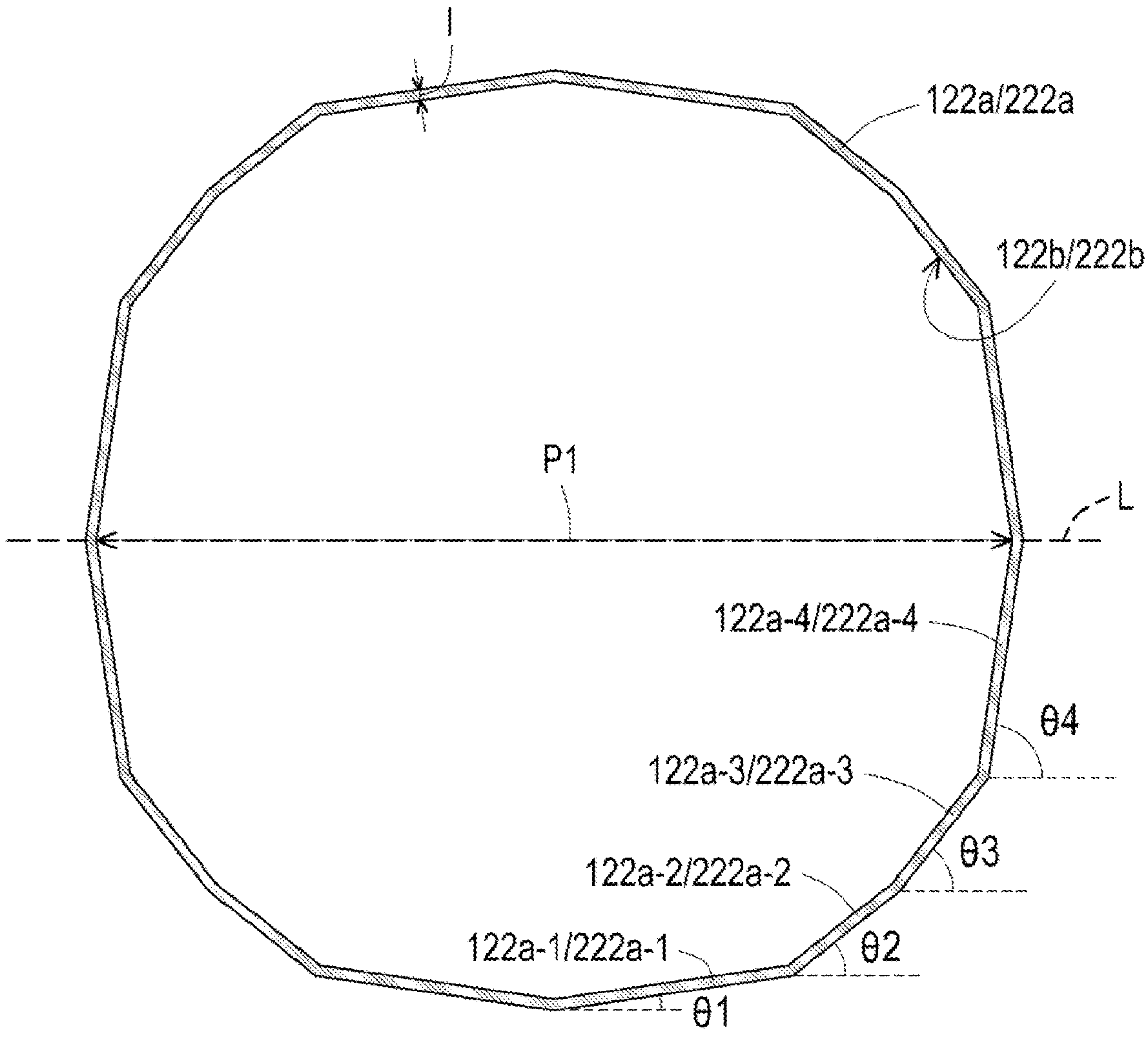
FIG. 7 is a sectional and enlarged schematic view of mesh lines and meshes according to one embodiment of the present disclosure.

FIG. 7 is a sectional and enlarged schematic view of mesh lines and meshes according to one embodiment of the present disclosure. Referring to FIG. 3, FIG. 4 and FIG. 7, in one embodiment, the mesh lines 122*a*/222*a* include first sections 122*a*-1/222*a*-1, second sections 122*a*-2/222*a*-2, third sections 122*a*-3/222*a*-3 and fourth sections 122*a*-4/222*a*-4 defining the meshes 122*b*/222*b* and connected in series with each other. The first sections 122*a*-1/222*a*-1, the second sections 122*a*-2/222*a*-2, the third sections 122*a*-3/222*a*-3 and the fourth sections 122*a*-4/222*a*-4 respectively form a first angle $\theta 1$, a second angle $\theta 2$, a third angle $\theta 3$ and a fourth angle $\theta 4$ with respect to a reference line L, and $\theta 4>\theta 3>\theta 2>\theta 1$, thus reducing the diffraction light intensity in both horizontal and vertical directions, thereby enhancing visual effects thereof.

For example, in one embodiment, a mesh line 122*a*/222*a* defining a mesh 122*b*/222*b* may optionally enclose a hexadecagon, and the reference line L may be a straight line passing through two corners of the hexadecagon, but the present disclosure is not limited thereto. In one embodiment, $\theta 4=81.7^\circ+2^\circ$, $\theta 3=51.6^\circ+2^\circ$, $\theta 2=38.3^\circ\pm2^\circ$, and $\theta 1=8.3^\circ+2^\circ$, but the present disclosure is not limited thereto.

In one embodiment, the meshes 122*b*/222*b* of the dimming panel 100 have a mesh arrangement period P1, and the pixels (not illustrated) of the transparent display panel 200 have a pixel arrangement period (not illustrated). The mesh arrangement period P1 may be greater than twice the pixel arrangement period, thus preventing the dimming panel 100 and the transparent display panel 200 from interference with each other and showing significant Moire patterns. In one embodiment, the mesh line 122*a*/222*a* defining a mesh 122*b*/222*b* may optionally enclose a hexadecagon, and the mesh arrangement period P1 may substantially be equal to a distance between two opposite corners of the hexadecagon, but the present disclosure is not limited thereto.

In one embodiment, an area coverage rate of the mesh lines 122*a*/222*a* to the first base 110/the second base 210 may be less than 4%. In one embodiment, the line width 1 of the mesh lines 122*a*/222*a* may vary based on the mesh arrangement period P1. In detail, when the mesh arrangement period P1 becomes larger, the line width 1 of the mesh lines 122*a*/222*a* may be wider.

It should be noted that the following embodiments use the reference numerals and certain contents of the aforementioned embodiment, in which identical or similar components are identified by identical reference numerals, and descriptions of the identical technical contents will be omitted. The omitted descriptions may be referenced to in the aforementioned embodiment, and are not hereinafter reiterated in the following embodiments.

Figure 8:
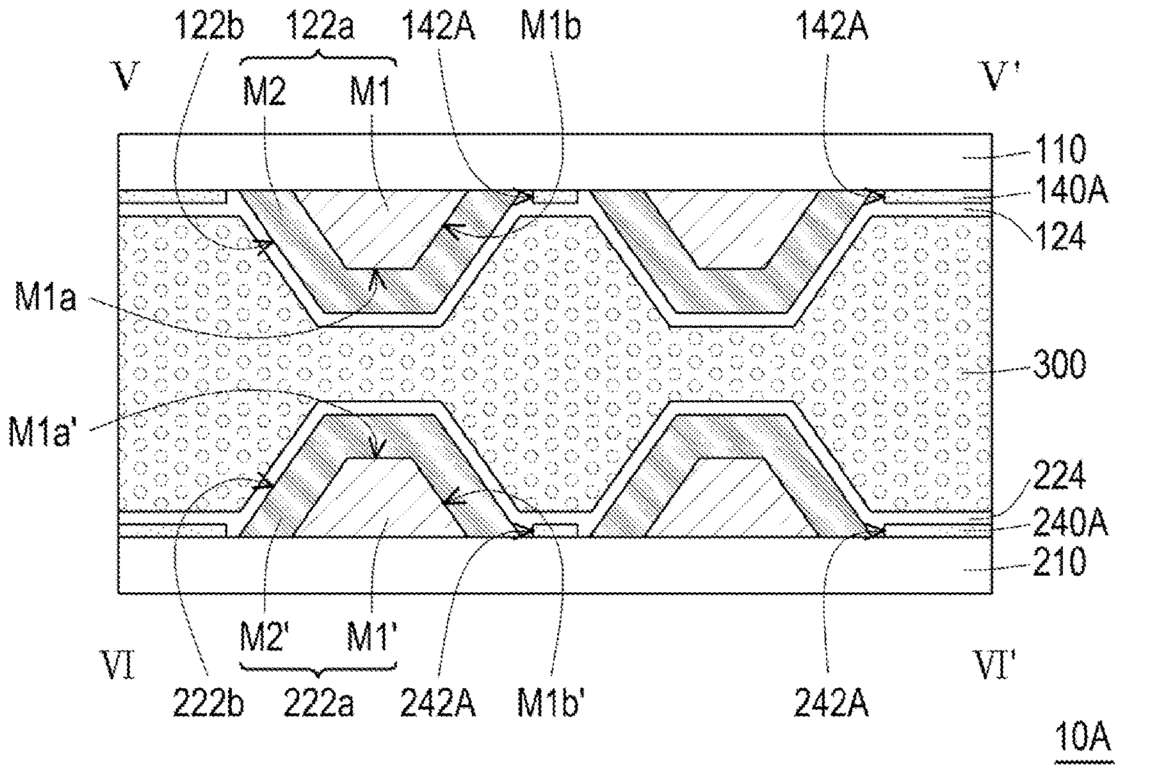
FIG. 8 is a sectional schematic view of a dimming panel according to another embodiment of the present disclosure.
Figure 9:
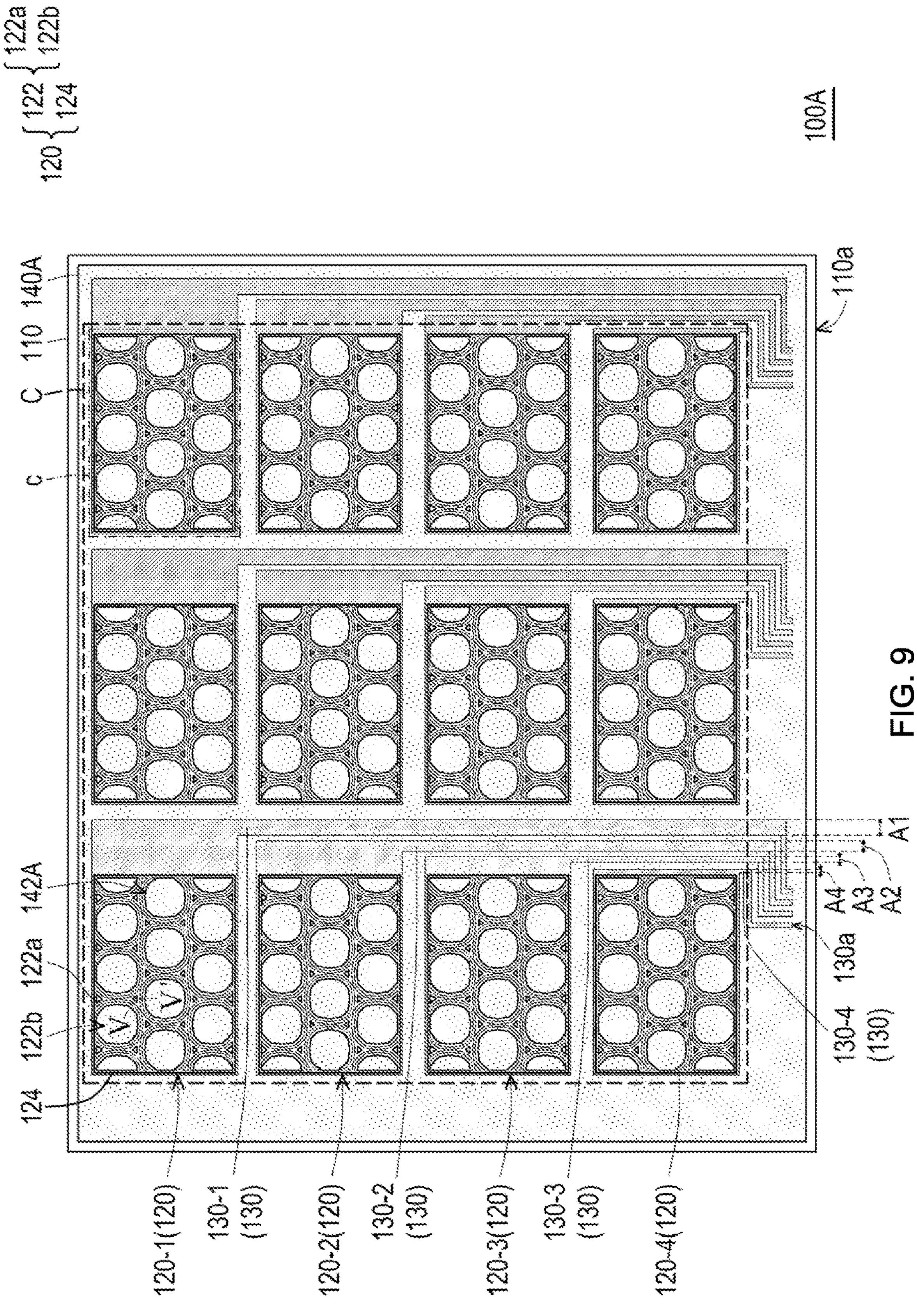
FIG. 9 is a top schematic view of a first substrate of the dimming panel according to another embodiment of the present disclosure.
Figure 10:
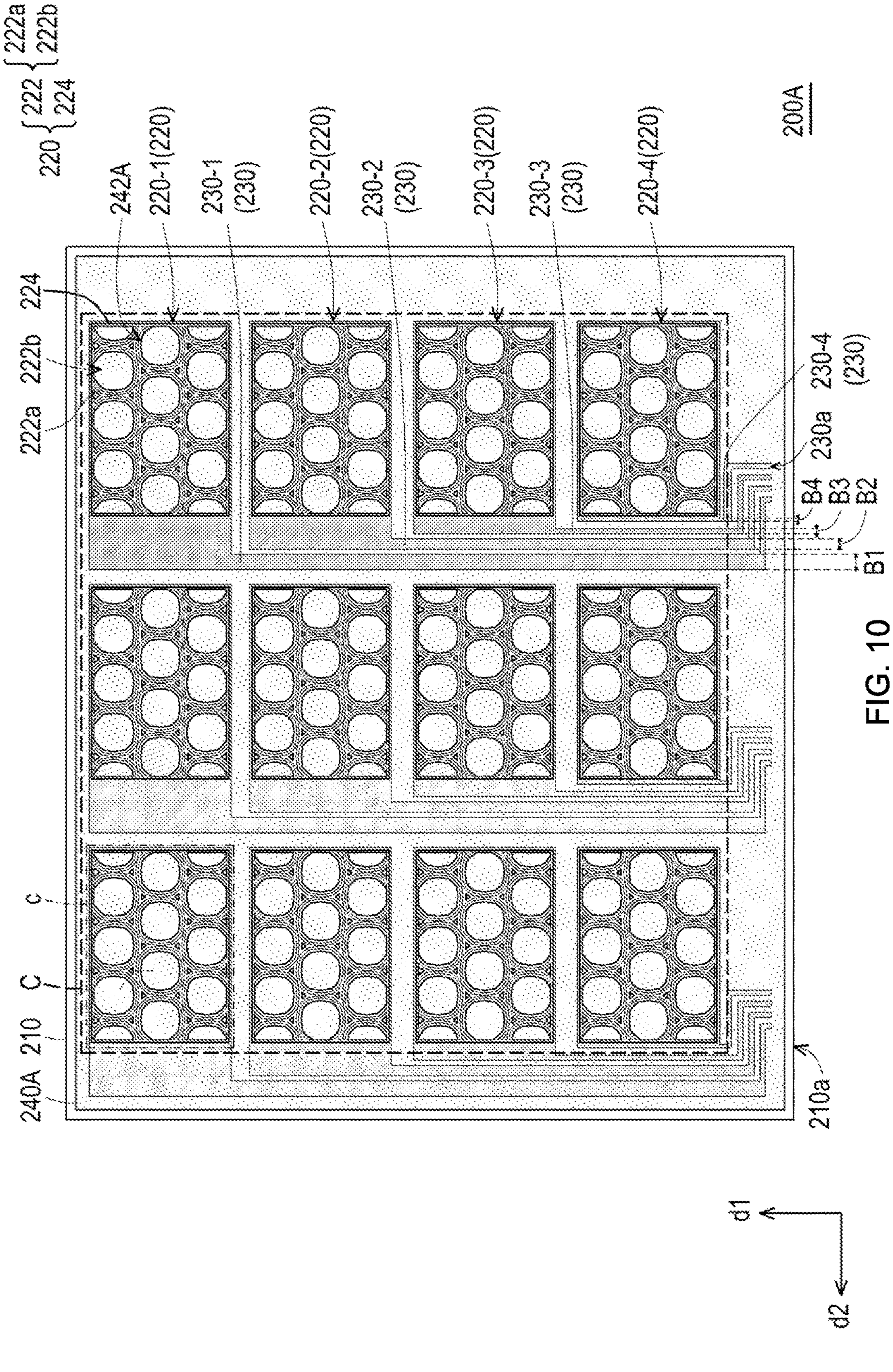
FIG. 10 is a top schematic view of a second substrate of the dimming panel according to another embodiment of the present disclosure.

FIG. 8 is a sectional schematic view of a dimming panel according to another embodiment of the present disclosure. FIG. 9 is a top schematic view of a first substrate of the dimming panel according to another embodiment of the present disclosure. FIG. 10 is a top schematic view of a second substrate of the dimming panel according to another embodiment of the present disclosure. FIG. 8 corresponds to the sectional line V-V' of FIG. 9 and the sectional line VI-VI' of FIG. 10.

Referring to FIG. 8, FIG. 9 and FIG. 10, the dimming panel 10A in the present embodiment is similar to the dimming panel 10 in the previous embodiment, and the difference between the two exists in that: the insulating layer 140A of the first substrate 100 of the dimming panel 10A in the present embodiment is different from the insulating layer 140 of the first substrate 100 of the dimming panel 10 in the previous embodiment, and the insulating layer 240A of the second substrate 200 of the dimming panel 10A in the present embodiment is different from the insulating layer 140 of the second substrate 200 of the dimming panel 10 in the previous embodiment.

Referring to FIG. 8 and FIG. 9, specifically, in the present embodiment, each opening 142A of the insulating layer 140A of the first substrate 100 overlaps with the mesh lines 122*a* of a corresponding electrode 120, and the insulating layer 140A of the first substrate 100 covers the meshes 122*b* of the electrodes 120. In short, in the embodiment, except for the openings 142A at the locations of the mesh lines 122*a*, the insulating layer 140A covers almost entirely the first base 110.

Referring to FIG. 8 and FIG. 10, similarly, in the present embodiment, each opening 242A of the insulating layer 240A of the second substrate 200 overlaps with the mesh lines 222*a* of a corresponding electrode 220, and the insulating layer 240A of the second substrate 200 covers the meshes 222*b* of the electrodes 220. In short, in the embodiment, except for the openings 242A at the locations of the mesh lines 222*a*, the insulating layer 240A covers almost entirely the second base 210.

Figure 11:
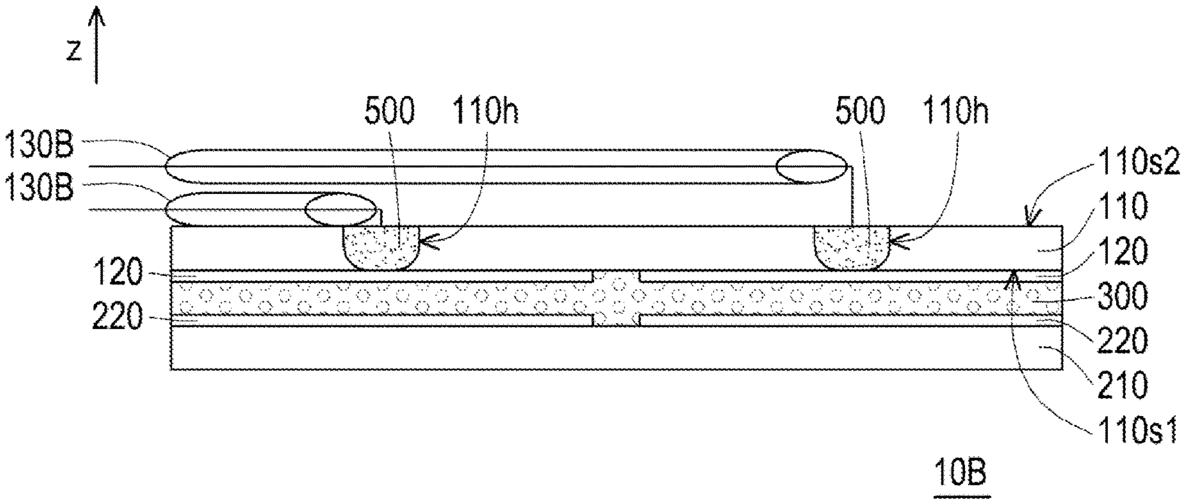
FIG. 11 is a sectional schematic view of a dimming panel according to a further embodiment of the present disclosure.
Figure 12:
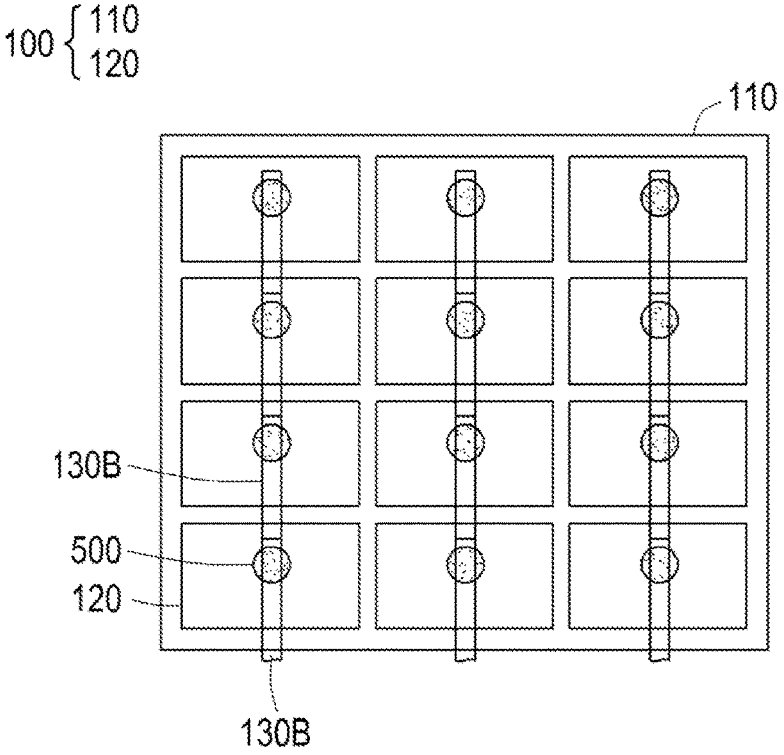
FIG. 12 is a top schematic view of a first substrate, conductive objects and traces of the dimming panel according to a further embodiment of the present disclosure.

FIG. 11 is a sectional schematic view of a dimming panel according to a further embodiment of the present disclosure. FIG. 12 is a top schematic view of a first substrate, conductive objects and traces of the dimming panel according to a further embodiment of the present disclosure.

Referring to FIG. 11 and FIG. 12, the dimming panel 10B in the present embodiment is similar to the dimming panel 10 in the previous embodiment, and the difference between the two exists in that: the locations of the traces 130, 130B and the ways of the traces 130, 130B being electrically connected to the electrodes 120 of the two are different. Specifically, in the present embodiment, the first base 110 has a first surface 110*s*1 and a second surface 110*s*2 opposite to each other. The first surface 110*s*1 faces toward the electrochromic layer 300, and the second surface 110*s*2 faces away from the electrochromic layer 300. The first base 110 has a plurality of through holes 110*h* running through the first surface 110*s*1 and the second surface 110*s*2. A plurality of conductive objects 500 are respectively filled into the through holes 110*h* of the first base 110, and the conductive objects 500 are electrically connected to the electrodes 120 respectively. A plurality of traces 130B are disposed on the second surface 110*s*2 of the first base 110 and are electrically connected to the conductive objects 500 respectively. The traces 130B are electrically connected to the electrodes 120 respectively through the conductive objects 500.

In one embodiment, the conductive objects 500 are, for example, silver paste, but the present disclosure is not limited thereto. In one embodiment, the traces 130B are, for example, modular wires, the first substrate 100 and the second substrate 200 are stacked in a vertical direction z, and the traces 130B electrically connected to the electrodes 120 in the same column may also be stacked in the vertical direction z, but the present disclosure is not limited thereto.

Figure 13:
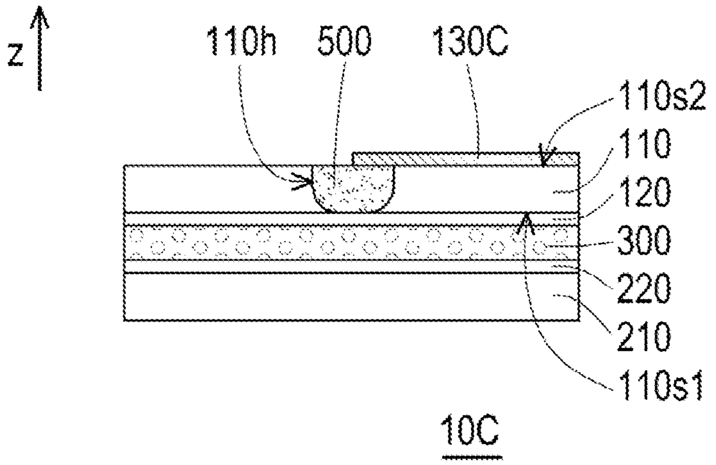
FIG. 13 is a sectional schematic view of a dimming panel according to yet another embodiment of the present disclosure.
Figure 14:
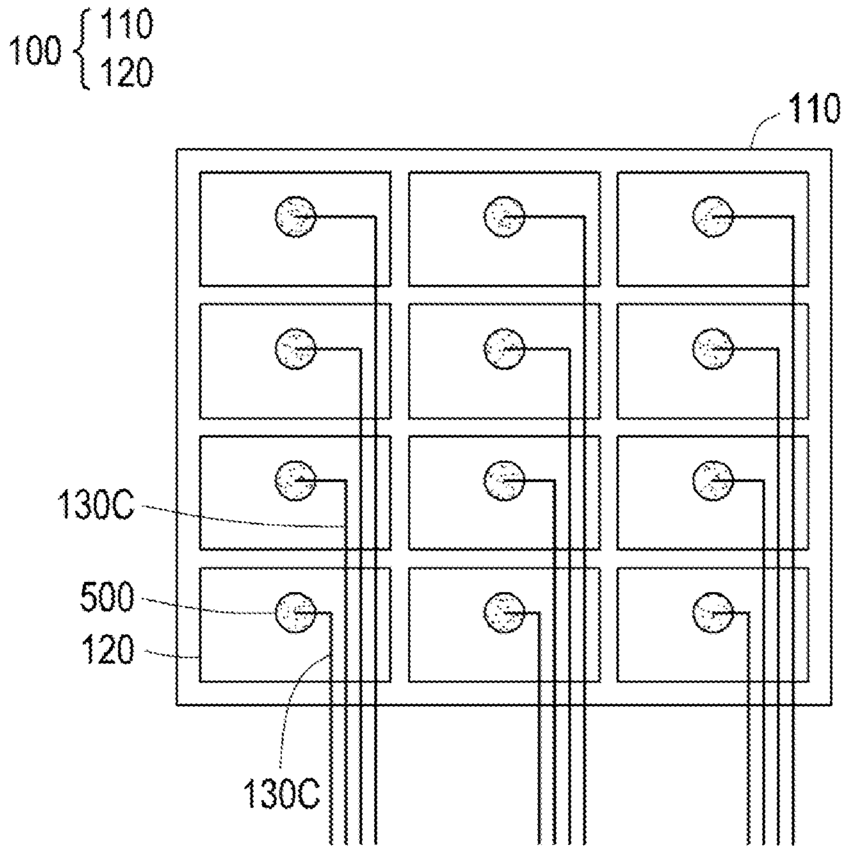
FIG. 14 is a top schematic view of a first substrate, conductive objects and traces of the dimming panel according to yet another embodiment of the present disclosure.

FIG. 13 is a sectional schematic view of a dimming panel according to yet another embodiment of the present disclosure. FIG. 14 is a top schematic view of a first substrate, conductive objects and traces of the dimming panel according to yet another embodiment of the present disclosure.

Referring to FIG. 13 and FIG. 14, the dimming panel 10C in the present embodiment is similar to the dimming panel 10B in the previous embodiment, and the difference between the two exists in that: the method of forming the traces 130C of the dimming panel 10C is different from the method of forming the traces 130B of the dimming panel 10B, and the method of disposing the traces 130C of the dimming panel 10C is different from the method of forming the traces 130B of the dimming panel 10B. Specifically, in the present embodiment, the traces 130C of the dimming panel 10C are formed on the second surface 110*s*2 of the first base 110 utilizing the photolithography process. In addition, in the present embodiment, the traces 130C may be disposed on the same plane (that is, the second surface 110*s*2), and the traces 130C are separated from each other in a horizontal direction y parallel to the first base 110.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electronic device, comprising:

a first base;

a plurality of electrodes, disposed on the first base, wherein each of the electrodes comprises:

a mesh conductive pattern, having a plurality of mesh lines and a plurality of meshes defined by the mesh lines; and a transparent conductive pattern, covering the mesh lines and the meshes, and electrically connected to the mesh conductive pattern;

a plurality of traces, disposed on the first base, and electrically connected to the electrodes respectively;

an insulating layer, disposed on the first base, and at least covering the traces;

a second base, disposed opposite to the first base; and an electrochromic layer, disposed between the first base and the second base;

wherein each of the traces comprises a first metal layer and a second metal layer, the second metal layer covers a top surface and a side wall of the first metal layer, the second metal layer is disposed between the insulating layer and the first metal layer, the insulating layer is disposed between the electrochromic layer and the second metal layer, and the insulating layer covers a top surface and a side wall of the second metal layer.

2. The electronic device according to claim 1, wherein a portion of the insulating layer is disposed between the transparent conductive pattern of a corresponding one of the electrodes and the second metal layer of a corresponding one of the traces.

3. The electronic device according to claim 1, wherein each of the mesh lines of the mesh conductive pattern comprises a first metal layer and a second metal layer, the second metal layer covers a top surface and a side wall of the first metal layer, the second metal layer is disposed between the transparent conductive pattern and the first metal layer, and the transparent conductive pattern is disposed between the electrochromic layer and the second metal layer.

4. The electronic device according to claim 1, wherein the insulating layer has a plurality of openings, and the transparent conductive patterns of the electrodes are filled into the openings and are electrically connected to the mesh conductive patterns of the electrodes.

5. The electronic device according to claim 4, wherein each of the openings overlaps with the mesh lines and the meshes of a corresponding one of the electrodes.

6. The electronic device according to claim 4, wherein each of the openings overlaps with the mesh lines of a corresponding one of the electrodes, and the insulating layer covers the meshes of the corresponding one of the electrodes.

7. The electronic device according to claim 1, wherein the mesh lines comprise a first section, a second section, a third section and a fourth section defining one of the meshes and connected in series with each other, the first section, the second section, the third section and the fourth section respectively form a first angle, a second angle, a third angle and a fourth angle with respect to a reference line, the first angle, the second angle, the third angle and the fourth angle are respectively $\theta 1$, $\theta 2$, $\theta 3$ and $\theta 4$, and $\theta 4 > \theta 3 > \theta 2 > \theta 1$.

8. The electronic device according to claim 1, wherein the traces respectively have a plurality of signal input terminals, the signal input terminals are disposed adjacent to an edge of the first base, a first direction intersects with the edge of the first base, the electrodes comprise a first electrode and a second electrode arranged in the first direction, the first electrode is farther away from the edge of the first base than the second electrode, the traces comprise a first trace and a second trace electrically connected to the first electrode and the second electrode respectively, a second direction intersects with the first direction, the first trace and the second trace respectively have a first line width and a second line width in the second direction, and the first line width is greater than the second line width.

9. The electronic device according to claim 1, wherein the traces respectively have a plurality of signal input terminals, the signal input terminals are disposed adjacent to an edge of the first base, a first direction intersects with the edge of the first base, the electrodes comprise a first electrode and a second electrode arranged in the first direction, the first electrode is farther away from the edge of the first base than the second electrode, the traces comprise a first trace and a second trace electrically connected to the first electrode and the second electrode respectively, and a voltage input to a respective signal input terminal of the first trace is greater than a voltage input to a respective signal input terminal of the second trace.

10. The electronic device according to claim 1, wherein the first base has a first surface and a second surface opposite to each other, the first surface faces toward the electrochromic layer, the second surface faces away from the electrochromic layer, the first base has a plurality of through holes running through the first surface and the second surface, the electronic device further comprises a plurality of conductive objects respectively filled into the through holes, the conductive objects are electrically connected to the electrodes respectively, and the traces are disposed on the second surface of the first base and are electrically connected to the conductive objects respectively.

11. An electronic device, comprising:

a first base;

a plurality of electrodes, disposed on the first base, wherein each of the electrodes comprises:

a mesh conductive pattern, having a plurality of mesh lines and a plurality of meshes defined by the mesh lines; and a transparent conductive pattern, covering the mesh lines and the meshes, and electrically connected to the mesh conductive pattern;

a plurality of traces, disposed on the first base, and electrically connected to the electrodes respectively;

an insulating layer, disposed on the first base, and at least covering the traces;

a second base, disposed opposite to the first base; and an electrochromic layer, disposed between the first base and the second base;

wherein the mesh lines comprise a first section, a second section, a third section and a fourth section defining one of the meshes and connected in series with each other, the first section, the second section, the third section and the fourth section respectively form a first angle, a second angle, a third angle and a fourth angle with respect to a reference line, the first angle, the second angle, the third angle and the fourth angle are respectively $\theta 1$, $\theta 2$, $\theta 3$ and $\theta 4$, and $\theta 4>\theta 3>\theta 2>\theta 1$.

12. The electronic device according to claim 11, wherein each of the mesh lines of the mesh conductive pattern comprises a first metal layer and a second metal layer, the second metal layer covers a top surface and a side wall of the first metal layer, the second metal layer is disposed between the transparent conductive pattern and the first metal layer, and the transparent conductive pattern is disposed between the electrochromic layer and the second metal layer.

13. The electronic device according to claim 11, wherein the insulating layer has a plurality of openings, and the transparent conductive patterns of the electrodes are filled into the openings and are electrically connected to the mesh conductive patterns of the electrodes.

14. The electronic device according to claim 13, wherein each of the openings overlaps with the mesh lines and the meshes of a corresponding one of the electrodes.

15. The electronic device according to claim 13, wherein each of the openings overlaps with the mesh lines of a corresponding one of the electrodes, and the insulating layer covers the meshes of the corresponding one of the electrodes.

16. The electronic device according to claim 11, wherein the traces respectively have a plurality of signal input terminals, the signal input terminals are disposed adjacent to an edge of the first base, a first direction intersects with the edge of the first base, the electrodes comprise a first electrode and a second electrode arranged in the first direction, the first electrode is farther away from the edge of the first base than the second electrode, the traces comprise a first trace and a second trace electrically connected to the first electrode and the second electrode respectively, a second direction intersects with the first direction, the first trace and the second trace respectively have a first line width and a second line width in the second direction, and the first line width is greater than the second line width.

17. The electronic device according to claim 11, wherein the traces respectively have a plurality of signal input terminals, the signal input terminals are disposed adjacent to an edge of the first base, a first direction intersects with the edge of the first base, the electrodes comprise a first electrode and a second electrode arranged in the first direction, the first electrode is farther away from the edge of the first base than the second electrode, the traces comprise a first trace and a second trace electrically connected to the first electrode and the second electrode respectively, and a voltage input to a respective signal input terminal of the first trace is greater than a voltage input to a respective signal input terminal of the second trace.

18. An electronic device, comprising:

a first base;

a plurality of electrodes, disposed on the first base, wherein each of the electrodes comprises:

a mesh conductive pattern, having a plurality of mesh lines and a plurality of meshes defined by the mesh lines; and a transparent conductive pattern, covering the mesh lines and the meshes, and electrically connected to the mesh conductive pattern;

a plurality of traces, disposed on the first base, and electrically connected to the electrodes respectively;

an insulating layer, disposed on the first base, and at least covering the traces;

a second base, disposed opposite to the first base; and an electrochromic layer, disposed between the first base and the second base;

wherein the traces respectively have a plurality of signal input terminals, the signal input terminals are disposed adjacent to an edge of the first base, a first direction intersects with the edge of the first base, the electrodes comprise a first electrode and a second electrode arranged in the first direction, the first electrode is farther away from the edge of the first base than the second electrode, the traces comprise a first trace and a second trace electrically connected to the first electrode and the second electrode respectively, a second direction intersects with the first direction, the first trace and the second trace respectively have a first line width and a second line width in the second direction, and the first line width is greater than the second line width.

19. The electronic device according to claim 18, wherein each of the mesh lines of the mesh conductive pattern comprises a first metal layer and a second metal layer, the second metal layer covers a top surface and a side wall of the first metal layer, the second metal layer is disposed between the transparent conductive pattern and the first metal layer, and the transparent conductive pattern is disposed between the electrochromic layer and the second metal layer.

20. The electronic device according to claim 18, wherein the insulating layer has a plurality of openings, and the transparent conductive patterns of the electrodes are filled into the openings and are electrically connected to the mesh conductive patterns of the electrodes.

* * * * *